(12) United States Patent
Azodi

(10) Patent No.: US 7,248,459 B2
(45) Date of Patent: Jul. 24, 2007

(54) INTEGRATED MULTI-CAPACITOR NETWORK

(76) Inventor: Mansoor Mike Azodi, 15 Albledsoe St., Sylmar, CA (US) 91342

( * ) Notice: Subject to any disclaimer, the term of this patent is extended or adjusted under 35 U.S.C. 154(b) by 475 days.

(21) Appl. No.: 10/751,100

(22) Filed: Dec. 31, 2003

(65) Prior Publication Data

US 2005/0141151 A1 Jun. 30, 2005

(51) Int. Cl.
*H01G 4/255* (2006.01)
(52) U.S. Cl. ............ 361/328; 361/301.4; 361/309; 361/311; 361/313; 361/321.2; 361/306.3
(58) Field of Classification Search .......... 361/328, 361/329–330, 302–305, 301.4, 308.2, 309, 361/311–313, 306.1, 306.2, 306.3, 321.1, 361/321.5
See application file for complete search history.

(56) References Cited

U.S. PATENT DOCUMENTS

| 4,665,465 | A | * | 5/1987 | Tanabe ................. 361/306.3 |
| 4,855,866 | A | * | 8/1989 | Imamura et al. .......... 361/306.2 |
| 4,866,566 | A | * | 9/1989 | Nishiyama ............... 361/306.2 |
| 5,414,589 | A | * | 5/1995 | Amano et al. ............ 361/306.3 |
| 6,058,004 | A | * | 5/2000 | Duva et al. .............. 361/301.4 |
| 6,198,619 | B1 | * | 3/2001 | Fujioka ..................... 361/328 |
| 6,414,835 | B1 | * | 7/2002 | Wolf et al. ................. 361/302 |
| 6,515,842 | B1 | * | 2/2003 | Hayworth et al. .......... 361/303 |
| 6,816,356 | B2 | * | 11/2004 | Devoe et al. ............... 361/309 |

* cited by examiner

*Primary Examiner*—Nguyen T. Ha
(74) *Attorney, Agent, or Firm*—Randall L. Owen

(57) ABSTRACT

A novel multi-capacitor divider network in which two capacitors are fabricated in a single package, using a common dielectric material, is disclosed. In a preferred embodiment of the present invention, the multi-capacitor network comprises a high-voltage capacitor and a low-voltage capacitor fabricated in a single monolithic package, both fabricated from a class one dielectric material having a combined tolerance of plus or minus five percent. The use of the same class one dielectric material for both capacitors assures that the temperature coefficents are similar for both capacitors and, more importantly, that the tolerance of the ratio between the high-voltage capacitor and low-voltage capacitor is within a predetermined range.

20 Claims, 5 Drawing Sheets

INTEGRATED MULTI-CAPACITOR NETWORK

BACKGROUND OF THE INVENTION

1. Field of the Invention

The present invention relates to backlighting systems for liquid crystal displays (LCDs), and more particularly to an integrated multi-capacitor divider network for use with a pulse-width-modulation (PWM) inverter controller for providing precise control of the voltage supplied to cold cathode fluorescent lamp (CCFL)-based backlighting systems.

2. Description of the Prior Art

LCDs are used in notebook computers, personal digital assistants (PDAs), automotive instrument panels, desktop displays, and other applications where size and performance are important. These LCDs are often illuminated in low ambient lighting conditions by a back- or edge-lighting system that uses one or more cold cathode fluorescent lamps (CCFLs) positioned at the edges of the display. Power for the CCFLs is normally provided by either a Buck/Royer oscillator inverter or a pulse-width-modulation (PWM) inverter controller that includes a capacitor charge pump circuit. Both the Buck/Royer oscillator and the PWM inverter controller convert a low-voltage direct current (DC) source into a high-voltage, high-frequency, quasi-sine wave that is required to ignite and power the CCFL. A typical igniting voltage is 1,500 VAC (RMS) and a typical operating voltage is 800 VAC (RMS), and the average CCFL tube life is 10,000 to 20,000 hours.

The Buck/Royer oscillator inverter uses a ballast capacitor in the range of 12 to 22 picofarads connected to the secondary of a high-voltage transformer and in series with the CCFL, in order to drop excess transformer voltage after the CCFL has ignited. Given a CCFL with 10 picofarads of nominal parasitic capacitance, the ballast capacitor and CCFL form a voltage divider such that only about 70 percent of the transformer output voltage is transferred through the ballast capacitor to ignite the CCFL. Therefore, the Buck/Royer oscillator inverter must develop 30 percent more voltage to ignite the CCFL, thus requiring a larger, more expensive transformer and related circuitry.

The PWM inverter controller uses a much larger DC bypass capacitor in the range of 100 nanofarads connected in series with the CCFL, so that virtually 100 percent of the transformer voltage is available for CCFL ignition. A capacitor charge pump circuit comprises a pair of capacitors connected to form a voltage divider, connected in parallel with the CCFL. Typically, one of the capacitors is a high-voltage (e.g., 3 kilovolt) NPO-type with a nominal capacitance of 5 to 33 picofarads. The other capacitor is a low-voltage (e.g., 50 volt) X7R-type with a nominal capacitance of 10 nanofarads, with the exact value determined by the desired ratio between the capacitors. The ratio of the values of these capacitors further determines the steady-state drive voltage across the CCFL, thereby determining the brightness of the illumination. Active open circuit voltage regulation is provided by non-dissipative voltage feedback.

The capacitors used in the charge pump circuit of the PWM inverter controller typically have a tolerance of five to 10 percent of their nominal value. Stated differently, if the nominal capacitance of the high-voltage capacitor is 10 picofarads, the actual value may range from nine picofarads to 11 picofarads. Because the steady-state drive voltage depends directly on the ratio of the capacitances, if one capacitor has an actual value on the high side of its tolerance, and the other an actual value on the low side of its tolerance, the resulting steady-state voltage and corresponding illumination can vary by up to 22 percent. This will cause variations and non-uniformity in the amount of light generated by the CCFL.

Accordingly, there is a need for an integrated multi-capacitor network having tolerances and temperature coefficients that vary in the same amount and direction, thereby assuring a predictable CCFL illumination.

SUMMARY OF THE INVENTION

The present invention is directed to a novel multi-capacitor divider network in which two capacitors are fabricated in a single package, using a common dielectric material, thereby assuring that both capacitors have the same tolerance and temperature coefficient performance.

In a preferred embodiment of the present invention, the multi-capacitor network comprises a high-voltage capacitor ($C_2$) and a low-voltage capacitor ($C_1$) fabricated in a single 1808, 1812 or other standard package. The capacitor network of the present invention is fabricated from a common Class 1 N2200 or similar dielectric material, that provides a design ratio ($C_2/C_1$) having a nominal tolerance of plus or minus five to 10 percent. The high-voltage capacitor has a typically rated voltage of 3,000 volts DC and the low-voltage capacitor has a rated voltage of less than 50 volts DC. The capacitance range of the high-voltage capacitor is five to 33 picofarads and the capacitance range of the low-voltage capacitor is up to 10 nanofarads, depending on the desired design ratio.

The key to achieving the ratio tolerance characteristic is to simultaneously fabricate both capacitors in a single package, using the same batch of N2200 material and same manufacturing processes. More particularly, the ratio tolerance and temperature characteristics of both capacitors must move in the same plus or minus direction. This is achieved by using the same batches of dielectric and conducting materials to fabricate each pair of capacitors.

The specific value of a capacitor (in Farads) is determined by the type of dielectric material, dielectric thickness (i.e., electrode separation), and cross-sectional area of the electrodes. More particularly, the capacitance is directly proportional to the dielectric constant of the dielectric material used to separate the electrodes. The dielectric constant measures the strength of the electric field that can be supported between the metal electrodes, and is an intrinsic property of the dielectric material. In addition, the capacitance is also directly proportional to the design active area of the electrodes, since this area determines the total amount of charge (i.e., number of positive or negative charges) that can accumulate on each electrode. Finally, the capacitance is inversely proportional to the distance between the electrodes, so the greater the separation the lower the capacitance.

In the present invention, the capacitors are fabricated in a single package using alternating layers of conducting metal and dielectric material. The high-voltage capacitor is fabricated first, layer by layer, followed by the low-voltage capacitor. Alternatively, the low-voltage capacitor can be fabricated first, followed by the high-voltage capacitor. The use of the same dielectric material for both capacitors assures that the temperature coefficent and voltage performance are similar for both capacitors and, more importantly, that the ratio tolerance moves in the same plus or minus direction. This is key to achieving the performance characteristics of the present invention.

Further features and advantages of the present invention will be appreciated by a review of the following detailed description of the preferred embodiments taken in conjunction with the following drawings.

BRIEF DESCRIPTION OF THE DRAWINGS

The present invention may be best understood by referring to the following detailed description of the preferred embodiments and the accompanying drawings, wherein like numerals denote like elements and in which.

DETAILED DESCRIPTION OF THE PREFERRED EMBODIMENTS

The following exemplary discussion focuses on a novel multi-capacitor divider network in which two capacitors are fabricated in a single package, using a common dielectric material, thereby assuring that the design ratio of the capacitors has a tolerance os plus or minus five to 10 percent, and that the temperature coefficient of each capacitor exhibits the same performance characteristics.

Figure 1:
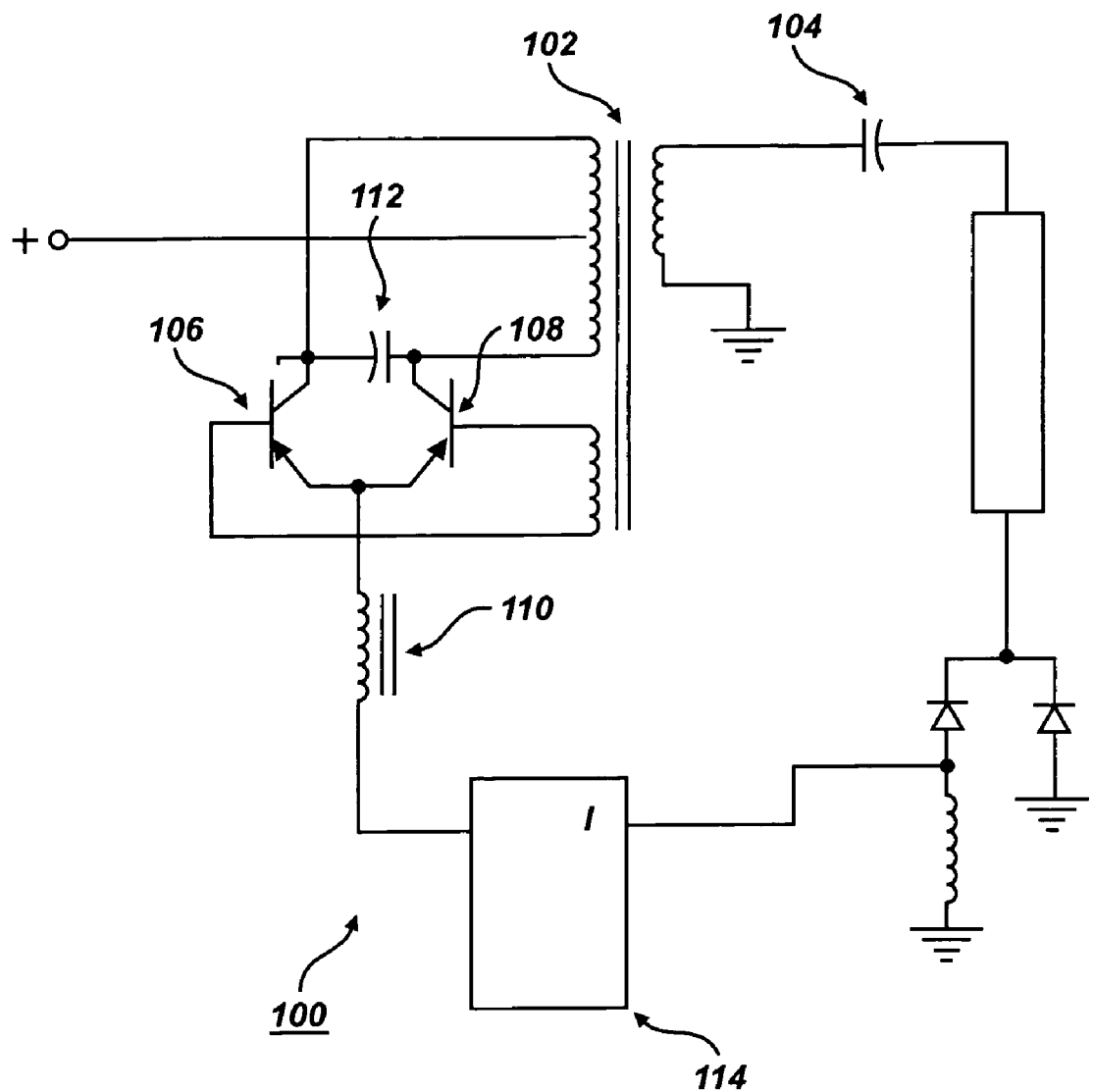
FIG. 1 shows a schematic diagram of a conventional Buck/Royer oscillator inverter 100 used to power a CCFL.

Referring to FIG. 1, a schematic diagram of a conventional (prior art) Buck/Royer oscillator inverter 100 is disclosed. Oscillator inverter 100 comprises a high-voltage transformer 102 having a dual-wound primary, a high-voltage ballast capacitor 104, a pair of power transistors 106-108, a power inductor 110, a polyphenelene sulfide (PPS) capacitor 112, and a controller 114. Power transistors 106-108, power inductor 110 and PPS capacitor 112 are connected to the dual-wound primary of high-voltage transformer 102 to form a resonating circuit for providing an alternating current to drive the primary of high-voltage transformer 102. High-voltage ballast capacitor 104 is connected in series between one side of the secondary of high-voltage transformer 102 and one side of the CCFL, in order to drop excess transformer voltage after the CCFL has ignited. The other side of the CCFL is connected to the monitoring input of controller 114 to provide current feedback from the CCFL.

The output side of oscillator inverter 100 functions as follows. Given a CCFL with 10 picofarads of parasitic capacitance and assuming that high-voltage ballast capacitor 104 has 22 picofarads of capacitance, the combination forms a voltage divider such that only about 70 percent of the output voltage of high-voltage transformer 102 is transferred through high-voltage ballast capacitor 104 to ignite the CCFL. Therefore, oscillator inverter 100 must develop 30 percent more voltage to ignite the CCFL, thus requiring a larger, more expensive transformer and related circuitry.

Figure 2:
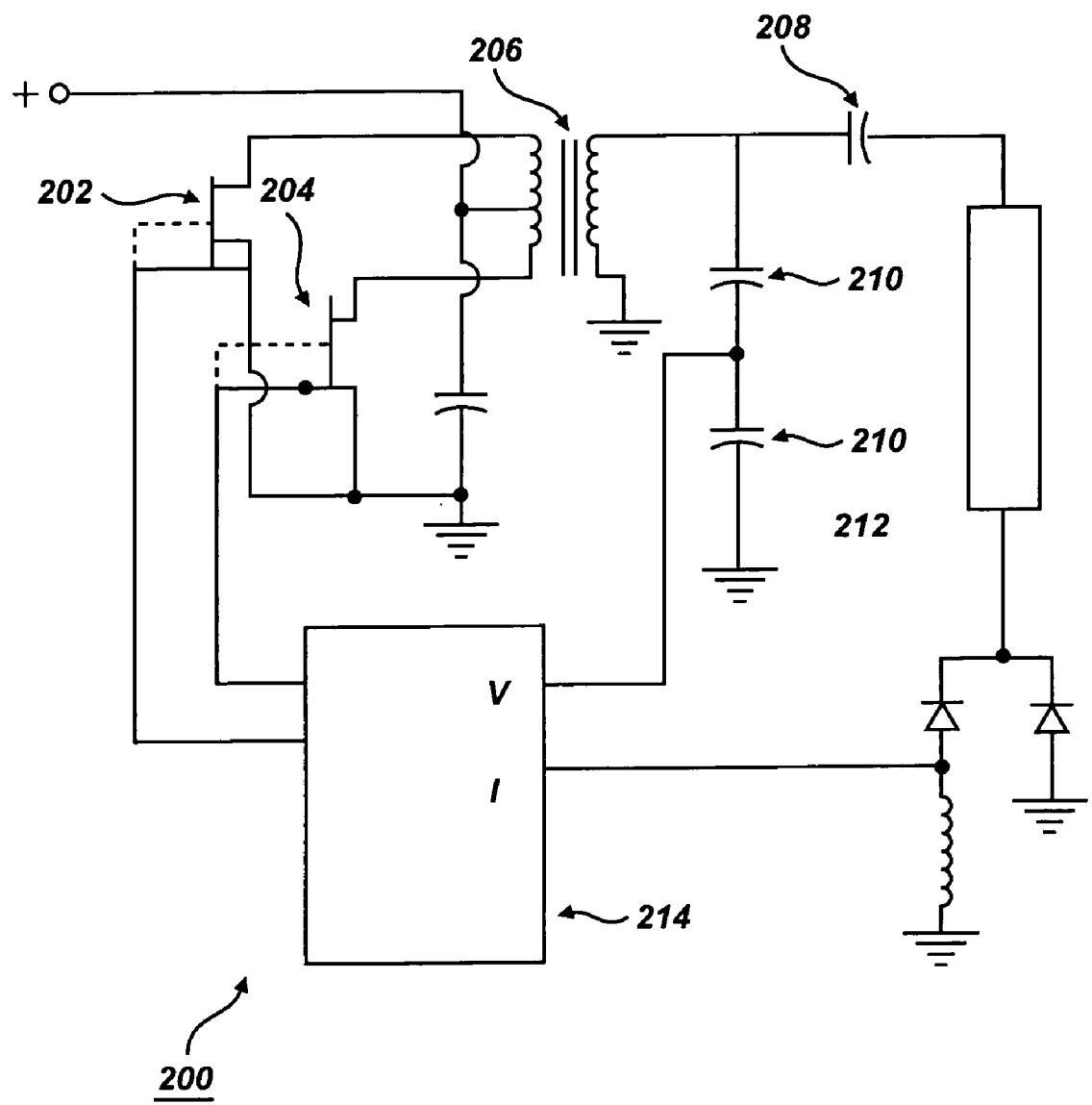
FIG. 2 shows a schematic diagram of a conventional pulse-width-modulated inverter controller 200 for use with the capacitor network of the present invention.

Referring now to FIG. 2, a schematic diagram of a conventional pulse-width-modulated (PWM) inverter controller 200 for use with the capacitor divider network of the present invention, is disclosed. PWM inverter controller 200 comprises power transistors 202-204, high-voltage transformer 206, ballast capacitor 208, high-voltage capacitor 210, low-voltage capacitor 212, and controller 214. Power transistors 202-204 are P- and N-channel field-effect transistors (FETs) connected to the primary of high-voltage transformer 206 in a push-pull configuration to provide a non-resonant, fixed frequency drive voltage, while simultaneously providing line and load regulation. Ballast capacitor 208 is connected between one side of the secondary of high-voltage transformer 206 and the CCFL, in order to drop excess transformer voltage after the CCFL has ignited. High-voltage capacitor 210 and low-voltage capacitor 212 form a voltage divider that provides a non-dissipative voltage monitoring feedback signal to controller 214, thereby providing active open-circuit voltage regulation while eliminating open circuit hazards. Controller 214 also receives a current feedback signal directly from the CCFL to provide additional voltage regulation to CCFL.

A comparison of the advantages and disadvantages of oscillator inverter 100 and PWM inverter controller 200 is as follows. The regulator portion of oscillator inverter 100 adjusts the input voltage to the oscillator circuit, thereby providing both line and voltage regulation. In addition, with oscillator inverter 100 the CCFL lamp brightness is insensitive to both static and dynamic input voltage changes. Further, the self-resonant oscillator inverter 100 provides a low crest factor sine wave to the CCFL.

The line and load regulation of PWM inverter controller 200 requires two power transistors, and is therefore simpler than the corresponding circuit of oscillator inverter 100. In addition, the non-resonant, fixed frequency drive of PWM inverter controller 200 eliminates the high-current PPS capacitor and the power inductor, thereby reducing overall size and cost as compared to oscillator inverter 100. Additionally, the higher value ballast capacitor of PWM inverter controller 200 requires less transformer output voltage to ingite the CCFL, thereby reducing the size and cost of the high-voltage transformer.

A key issue with PWM inverter controller 200 is the voltage divider comprised of high-voltage capacitor 210 and low-voltage capacitor 212. As mentioned above, this voltage divider is designed to achieve a specific ratio between high-voltage capacitor 210 and low-voltage capacitor 212. Stated differently, the value of high-voltage capacitor and a target ratio are selected, and this determines the value of low-voltage capacitor 212.

A problem can occur, however, due to the tolerances of each capacitor. Tolerance in this case refers to the possible variations in the values of each capacitor and is typically expressed as a percent of the design or rated capacitance. These variations are the result of differences in manufacturing and/or material lots and are a normal result of the manufacturing process. For example, a 10 picofarad capacitor with a tolerance of 10 percent could have an actual value that ranges from nine picofarads to 11 picofarads. This variation in actual capacitance of one or both of the capacitors can change the actual value of the desired voltage divider ratio by up to 22 percent which, in turn, will cause corresponding variations in the illumination intensity of the CCFL.

Figure 3:
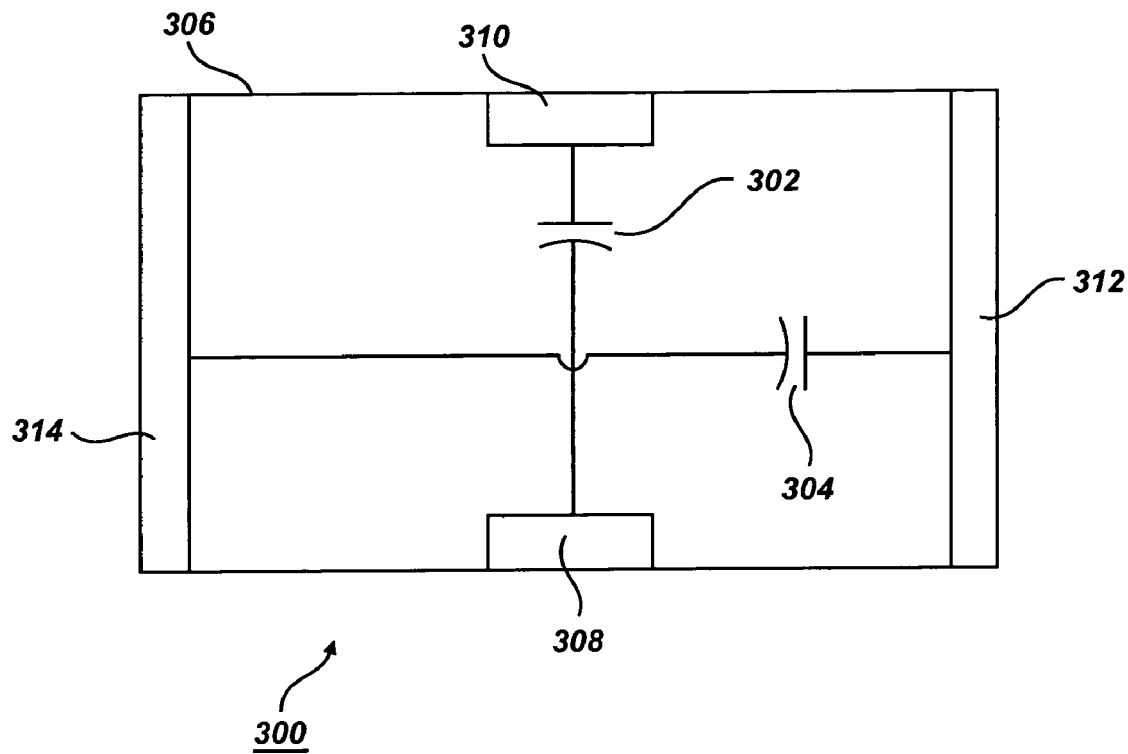
FIG. 3 shows a schematic diagram of a capacitor network 300 constructed in accordance with the present invention.

Continuing now with FIG. 3, a schematic diagram of a capacitor network 300 constructed in accordance with the present invention, is disclosed. Capacitor network 300 comprises a low-voltage capacitor 302 and a high-voltage capacitor 304, both fabricated and packaged in a single housing 306. The electrical terminals 308-310 for low-voltage capacitor 302 are located on opposite ends of housing 306, and the electrical terminals 312-314 for high-voltage capacitor 304 are similarly located on opposite sides of housing 306. Note that there is no internal connection between low-voltage capacitor 302 and high-voltage capacitor 304.

The close proximity of electrical terminal 312 with electrical terminals 308 and 310 can result in electrical arcing and a short circuit. An identical situation can occur between electrical terminal 314 and electrical terminals 310 and 312. In order to avoid arcing between the electrical terminals, a coating of insulating material 316 can be applied to the entire surface of housing 306.

Figure 4A:
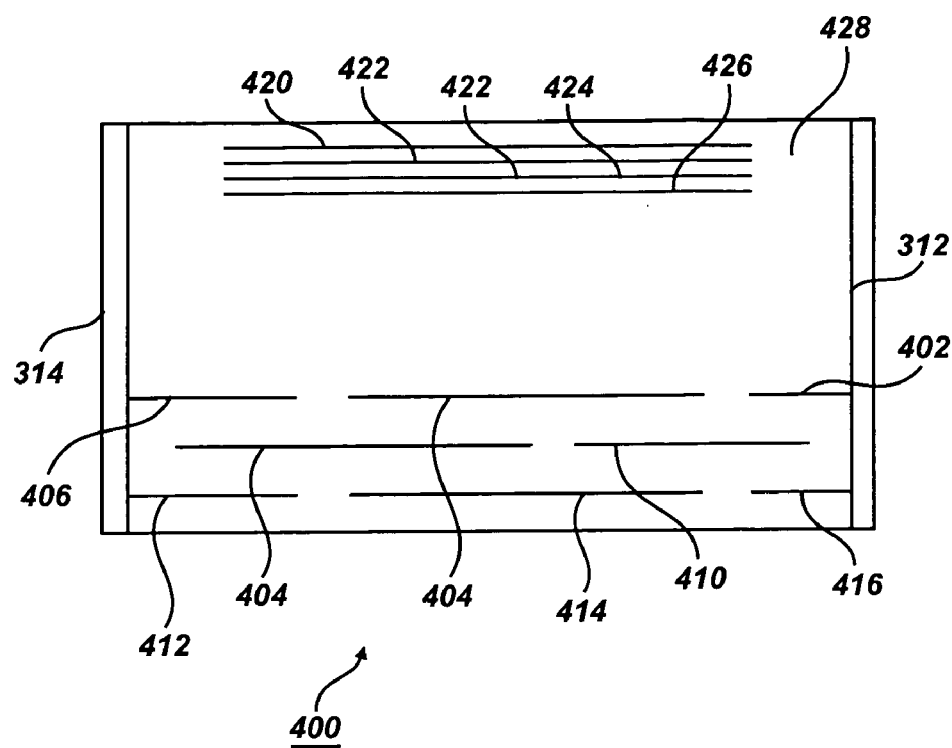
FIGS. 4A and 4B show are diagrams showing the internal structure 400 of capacitor network 300.
Figure 4B:
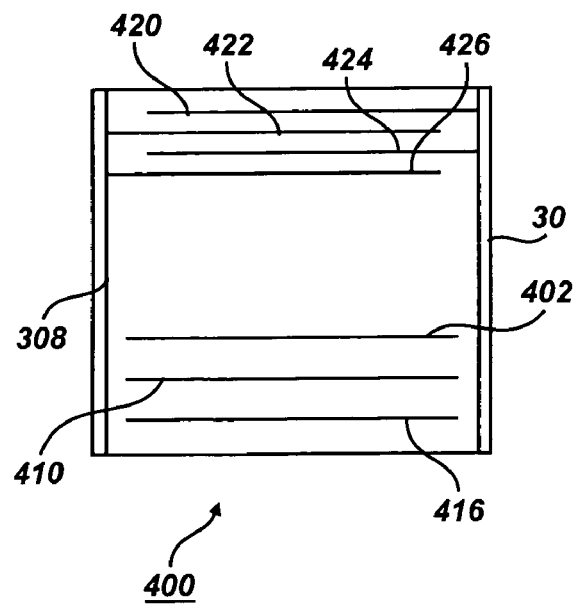

Referring to FIGS. 4A and 4B, an internal structure 400 of capacitor network 300 is shown. Internal structure 400 comprises alternating layers of electrode and dielectric material, with high-voltage capacitor 304 fabricated on the bottom and low-voltage capacitor 302 fabricated on the top. In the preferred embodiment, high-voltage capacitor 304 is first fabricated using electrode layers 402-416 separated by layers of class 1 dielectric. Low-voltage capacitor 302 is then fabricated using electrode layers 420-426, again separated by layers of class 1 dielectric.

More specifically as shown in FIG. 4A, high-voltage capacitor 304 comprises eight electodes 402-416 arranged in a three layer series-parallel or "double-float" configuration. As will be apparent to those skilled in the art, this configuration distributes the voltage drop across the series capacitors, thereby reducing the chance of arc-over under high voltage conditions. For example, in a standard 1812 package with dimensions of 222 mils by 150 mils, electrode layers 402-416 are configured with 50 mils of horizontal separation between electrodes and 25 mils of horizonal separation between electrode and package boundary. For a capacitor rated at 3,000 volts DC, this configuration results in an actual voltage drop of 1,000 volts DC across each capacitor.

As further shown in FIG. 4A, electrodes 402 and 406 are connected to termination 312, while electrodes 412 and 416 are connecetd to termination 314. The result is a series-parallel configuration of six capacitors, two groups of three capacitors connected in series and the two groups connected in parallel.

Continuing with FIGS. 4A and 4B, low-voltage capacitor 302 comprises four electrodes arranged in a mutually parallel configuration, with alternate electrodes connected to common terminations 308 and 310.

Figure 5:
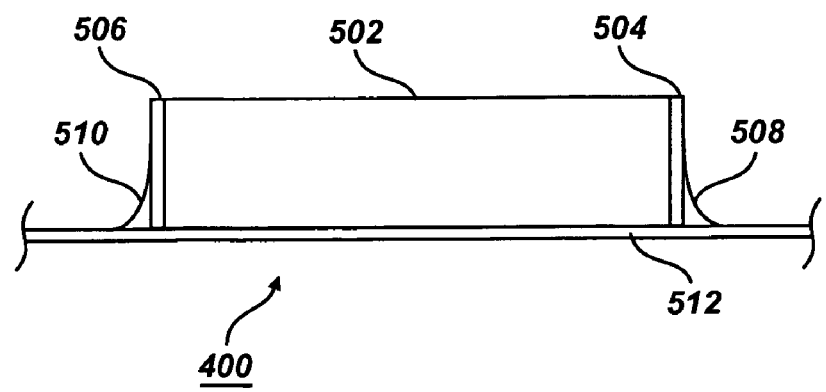
FIG. 5 shows a typical capacitor assembly 500 of the present invention which uses flexible terminations.

Referring now to FIG. 5, a typical capacitor assembly 500 of the present invention which uses flexible terminations, is shown. Capacitor assembly 500 comprises a capacitor 502 having terminations 504 and 506, and that is attached to a circuit board 512 by flow solder points 508 and 510. This type of assembly is typicallly used to fix capacitors and other thin-film components to circuit boards.

A problem can arise, however, with longer components and/or narrow circuit boards that are subject to flexing and twisting. This flexing and twisting can result in stress forces that can fracture the component body and/or the flow solder points.

Figure 6:
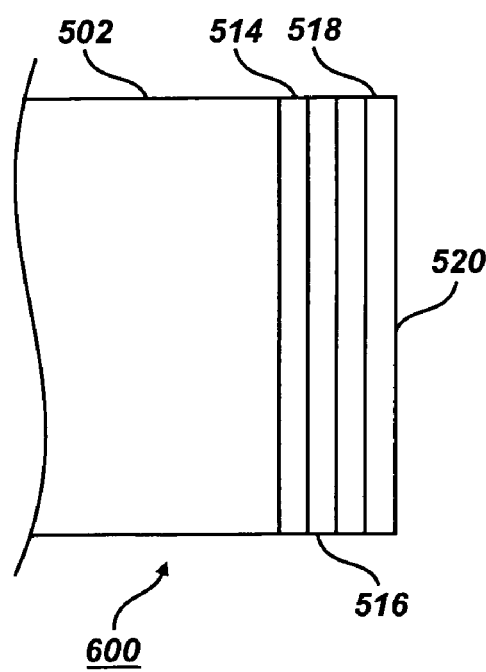
FIG. 6 shows a flexible termination structure 600 for use with the capacitor network of the present invention.

In FIG. 6, a flexible termination structure 600 for use with the capacitor network of the present invention, is shown. Flexible termination structure 600 comprises a gold termination 514 to which a gold polymer layer 516 is bonded. A nickel layer 518 is bonded to gold polymer layer 516 and a tin layer 520 is bonded to nickel layer 518. Gold polymer layer 516 is a flexible, conductive layer that allows a small amount of relative motion or displacement between capacitor 502 and circuit board 512. This provides a one to 5 millimeter improvement in the amount of circuit board flexing that can occur without fracturing capacitor 502 of solder terminations 508 and 510.

The foregoing description includes what are at present considered to be preferred embodiments of the invention. However, it will be readily apparent to those skilled in the art that various changes and modifications may be made to the embodiments without departing from the spirit and scope of the invention. For example, the specific type of dielectric material or the number and spacing of layers may be modified or changed. Accordingly, it is intended that such changes and modifications fall within the spirit and scope of the invention, and that the invention be limited only by the following claims.

What is claimed is:

1. A capacitor network comprising:
a first capacitor, said first capacitor having a first temperature coefficient and a first nominal capacitance, said first nominal capacitance value having a first tolerance range, and said first nominal capacitance value independently determined;
a second capacitor, said second capacitor having a second temperature coefficient and a second nominal capacitance, said second nominal capacitance value having a second tolerance range, and said second nominal capacitance value determined by a design ratio between said first nominal capacitance value and said second nominal capacitance value;
said first capacitor and said second capacitor fabricated in a single package using a common dielectric material;
whereby said design ratio has a predetermined tolerance range that is independent of said first and second tolerance ranges and said first and second temperature coefficients.

2. The capacitor network of claim 1, wherein said first capacitor further comprises a first plurality of parallel electrodes, each of said first plurality of parallel electrodes separated by said common dielectric material.

3. The capacitor network of claim 2, wherein said first plurality of parallel electrodes are separated by a first predetermined distance.

4. The capacitor network of claim 1, wherein said second capacitor further comprises a second plurality of parallel electrodes, each of second plurality of parallel electrodes separated by said common dielectric material.

5. The capacitor network of claim 4, wherein said second plurality of parallel electrodes are separated by a second predetermined distance.

6. The capacitor network of claim 1, wherein said common dielectric material comprises a class one dielectric material.

7. The capacitor network of claim 6, wherein said class one dielectric material comprises N2200 dielectric material.

8. The capacitor network of claim 1, where said first tolerance range further comprises a first lower limit and a first upper limit, said first nominal capacitance value between said first lower limit and said first upper limit, and said first lower limit and said first upper limit measured as a percentage of said first nominal capacitance value.

9. The capacitor network of claim 1, where said second tolerance range further comprises a second lower limit and a second upper limit, said second nominal capacitance value between said second lower limit and said second upper limit, and said second lower limit and said second upper limit measured as a percentage of said second nominal capacitance value.

10. The capacitor network of claim 1, wherein said first nominal capacitance and said second nominal capacitance are related by a predetermined ratio, said predetermined ratio determined by dividing said second nominal capacitance by said first nominal capacitance, and said second nominal capacitance established by multiplying said first nominal capacitance by said predetermined ratio.

11. A capacitor network comprising:
a first capacitor, said first capacitor having a first temperature coefficient and a first nominal capacitance value having a first tolerance range, said first nominal capacitance value independently determined, said first capacitor further comprising a first plurality of parallel electrodes, each of said first plurality of parallel electrodes separated by said common dielectric material;
a second capacitor, said second capacitor having a second temperature coefficient and a second nominal capacitance value having a second tolerance range, said second nominal capacitance value determined by a design ratio between said first nominal capacitance value and said second nominal capacitance value, said second capacitor further comprising a second plurality of parallel electrodes, each of second plurality of parallel electrodes separated by said common dielectric material;
said first capacitor and said second capacitor fabricated in a single package using a common dielectric material, said common dielectric material further said common dielectric material comprises a class one dielectric material comprising a class one dielectric material;
whereby said design ratio has a predetermined tolerance range that is independent of said first and second tolerance ranges and said first and second temperature coefficients.

12. The capacitor network of claim 11, wherein said first plurality of parallel electrodes are separated by a first predetermined distance.

13. The capacitor network of claim 11, wherein said second plurality of parallel electrodes are separated by a second predetermined distance.

14. The capacitor network of claim 11, wherein said class one dielectric material comprises N2200 dielectric material.

15. The capacitor network of claim 11, where said first tolerance range further comprises a first lower limit and a first upper limit, said first nominal capacitance value between said first lower limit and said first upper limit, and said first lower limit and said first upper limit measured as a percentage of said first nominal capacitance value.

16. The capacitor network of claim 11, where said second tolerance range further comprises a second lower limit and a second upper limit, said second nominal capacitance value between said second lower limit and said second upper limit, and said second lower limit and said second upper limit measured as a percentage of said second nominal capacitance value.

17. A capacitor network comprising:
a first capacitor, said first capacitor having a first temperature coefficient and a first nominal capacitance value having a first tolerance range, said first nominal capacitance value independently determined, said first capacitor further comprising a first plurality of parallel electrodes, each of said first plurality of parallel electrodes separated by said common dielectric material, said first tolerance range further comprises a first lower limit and a first upper limit, said first nominal capacitance value between said first lower limit and said first upper limit, and said first lower limit and said first upper limit measured as a percentage of said first nominal capacitance value;
a second capacitor, said second capacitor having a second temperature coefficient and a second nominal capacitance value having a second tolerance range, said second nominal capacitance value determined by a design ratio between said first nominal capacitance value and said second nominal capacitance value, said second capacitor further comprising a second plurality of parallel electrodes, each of second plurality of parallel electrodes separated by said common dielectric material, further comprises a second lower limit and a second upper limit, said second nominal capacitance value between said second lower limit and said second upper limit, and said second lower limit and said second upper limit measured as a percentage of said second nominal capacitance value;
said first capacitor and said second capacitor fabricated in a single package using a common dielectric material, said common dielectric material further said common dielectric material comprises a class one dielectric material comprising a class one dielectric material;
whereby said design ratio has a predetermined tolerance range that is independent of said first and second tolerance ranges and said first and second temperature coefficients.

18. The capacitor network of claim 17, wherein said first plurality of parallel electrodes are separated by a first predetermined distance.

19. The capacitor network of claim 17, wherein said second plurality of parallel electrodes are separated by a second predetermined distance.

20. The capacitor network of claim 17, wherein said class one dielectric material comprises N2200 dielectric material.

* * * * *